United States Patent [19]
Hanada et al.

[11] Patent Number: 5,518,270
[45] Date of Patent: May 21, 1996

[54] KNEE PROTECTOR DEVICE FOR VEHICLE

[75] Inventors: Koutarou Hanada, Hadano; Noriki Fujisawa, Fuchu; Tugio Hirose, Machida; Hirofumi Sawada, Sagamihara; Shuichi Koide, Atsugi; Morimitsu Kobayashi; Makoto Tamuraya, both of Isehara; Asao Takei, Sagamihara; Yoshiki Kawasaki, Atsugi; Hiroshi Ohyama, Chigasaki; Youichi Tanabe, Ebina, all of Japan

[73] Assignee: Nissan Motor Co., Ltd., Yokohama, Japan

[21] Appl. No.: 412,378

[22] Filed: Mar. 29, 1995

[30] Foreign Application Priority Data

| Mar. 30, 1994 | [JP] | Japan | 6-060548 |
| Mar. 30, 1994 | [JP] | Japan | 6-060549 |
| Mar. 30, 1994 | [JP] | Japan | 6-060550 |
| Mar. 30, 1994 | [JP] | Japan | 6-060551 |

[51] Int. Cl.⁶ ............................................. B60R 21/04
[52] U.S. Cl. ......................................... 280/751; 280/748
[58] Field of Search ............................. 280/748, 751, 280/752

[56] References Cited

U.S. PATENT DOCUMENTS

| 3,964,578 | 6/1976 | Campbell et al. | 280/752 |
| 5,037,130 | 8/1991 | Okuyama | 280/752 |
| 5,096,223 | 3/1992 | Tekelly et al. | 280/748 |
| 5,201,544 | 4/1993 | Matano et al. | 280/751 |
| 5,370,417 | 12/1994 | Kelman et al. | 280/751 |

FOREIGN PATENT DOCUMENTS

| 62-86437 | 6/1987 | Japan . |
| 62-88659 | 6/1987 | Japan . |
| 2-175455 | 7/1990 | Japan . |

Primary Examiner—Kenneth R. Rice
Attorney, Agent, or Firm—Foley & Lardner

[57] ABSTRACT

A vehicular knee protector device is comprised of a protector body and a pair of brackets. Each bracket is constituted by a V-shaped lower bracket and a V-shaped lower bracket. The upper bracket is fixed to the lower bracket so as to form a polygon space which is preferable deformed when predetermined force is applied to the knee protector device. Further, the lower bracket is formed so that a side to be connected to a vehicle body is structurally stronger than a side to be connected to a protector body to which driver's knees are impacted.

19 Claims, 12 Drawing Sheets

KNEE PROTECTOR DEVICE FOR VEHICLE

BACKGROUND OF THE INVENTION

1. Field of the Invention

The present invention relates to improvements in a knee protector device installed in a vehicle, and more particularly to a knee protector device which improves energy absorbing ability and assembling workability.

2. Description of the Prior Art

A variety of vehicular knee protector devices have been proposed and in practical use. Japanese Patent Provisional Publication No. 2-175455 discloses a typical vehicular knee protector device which is constituted by a plurality of brackets and a protector body. The bracket is constituted by a V-shaped main bracket and a generally semi-cylindrical member, and is connected to the protector body and to a vehicle body through a steering support member. This knee protector device is arranged to absorb impact force in a manner of the deformation of the brackets. That is, the V-shaped main bracket is bent at a middle portion of the V-shape while bending the semi-cylindrical member when predetermined force is applied to the knee protector.

However, it is preferable to further improve the energy absorbing ability and the assembly workability of conventional knee protector devices.

SUMMARY OF THE INVENTION

It is an object of the present invention to provide an improved knee protector device which provides an easy assembly workability and a sufficient deformation mode against predetermined force.

It is another object of the present invention to provide a vehicular knee protector device which has a rigidity against vertical vibrations while satisfying a sufficient energy absorbing characteristic during deformation thereof.

A first aspect of the present invention is a knee protector device which comprises a knee protector body and a pair of brackets connected to the knee protector body. The bracket is constituted by a lower bracket and an upper bracket. The lower bracket is formed in a generally V-shape and has a bend guide portion at a middle portion of the V-shaped lower bracket. The upper bracket is formed in a generally V-shape and has a bend guide portion at a middle portion of the V-shaped upper bracket. The upper bracket is connected with the lower bracket so that both V-shapes of the upper and lower brackets are arranged in the same direction.

A second aspect of the present invention is a vehicular knee protector which comprises a V-shaped bracket and a knee protector body. The bracket comprises a front portion and a rear portion which is integral with the front portion at a middle portion of the V-shape. A bend guide portion is formed at the middle portion of the V-shape so as to start to bend from the bend guide portion when predetermined force is applied. The bracket is formed to define a groove which extends from the front portion to the rear portion. The knee protector body is connected to the rear portion of the bracket. The groove is formed so that the depth of the groove at the front portion is deeper than that at the rear portion.

BRIEF DESCRIPTION OF THE DRAWINGS

In the drawings, like reference numerals designate like parts and elements throughout all figures; in which.

DETAILED DESCRIPTION OF THE INVENTION

Referring to FIGS. 1 to 12, there is shown a first embodiment of a knee protector device 1 installed in a vehicle according to the present invention.

Figure 1:
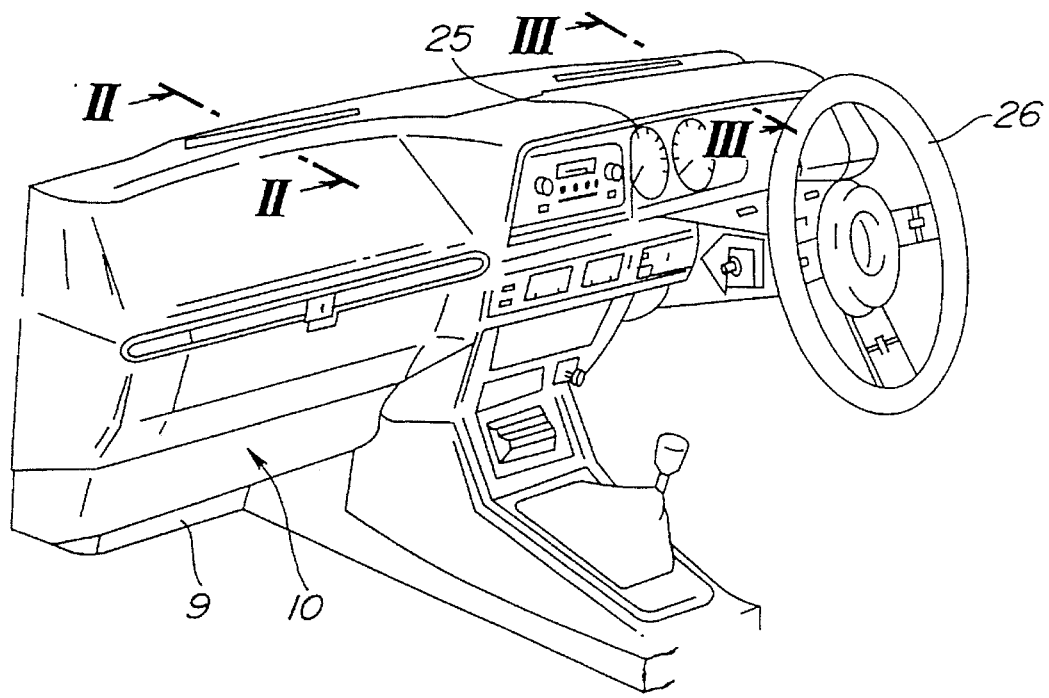
FIG. 1 is a perspective view of an instrument panel of a vehicle in which a knee protector device according to the present invention is disposed.
Figure 2:
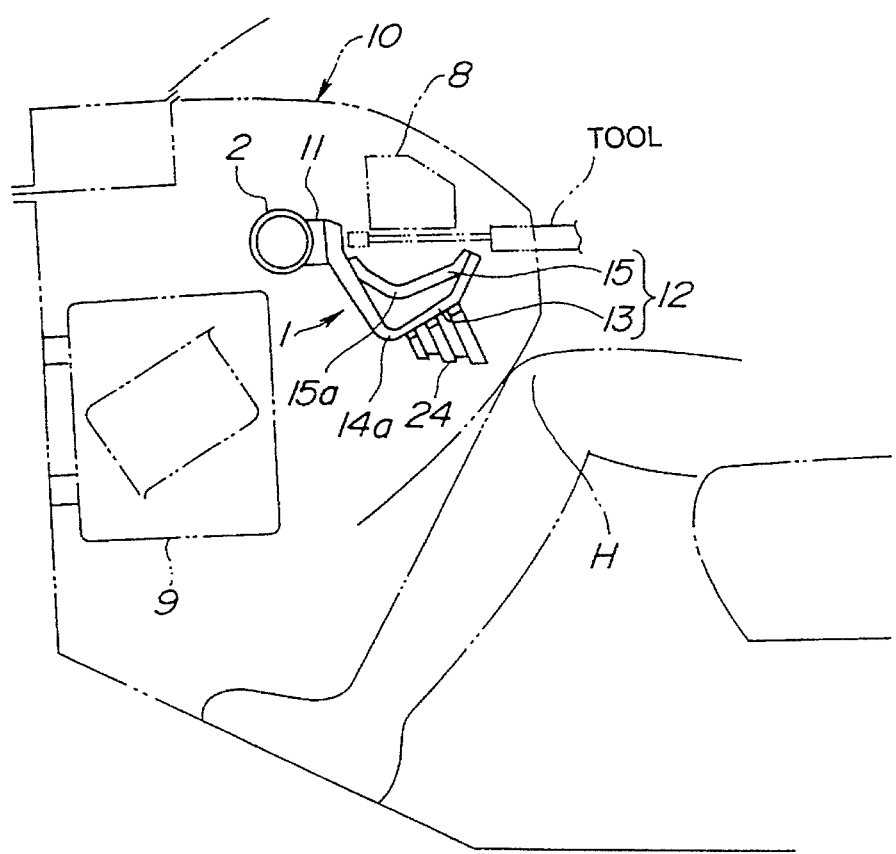
FIG. 2 is a cross-sectional view of FIG. 1 taken in the direction of arrows along the II—II lines.
Figure 3:
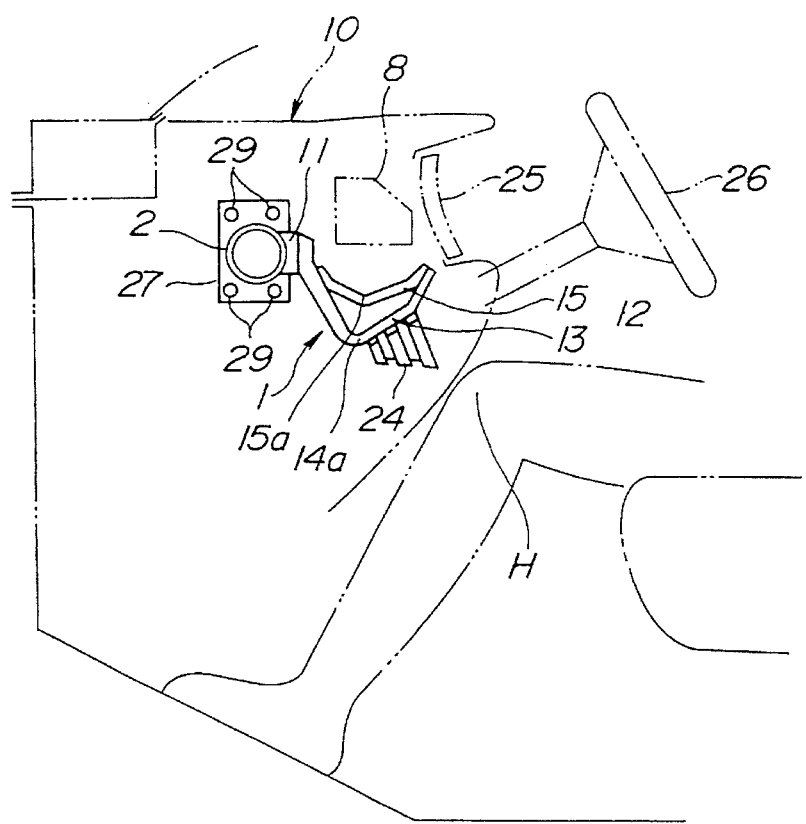
FIG. 3 is a cross-sectional view of FIG. 1 taken in the direction of arrows along the III—III lines.
Figure 4:
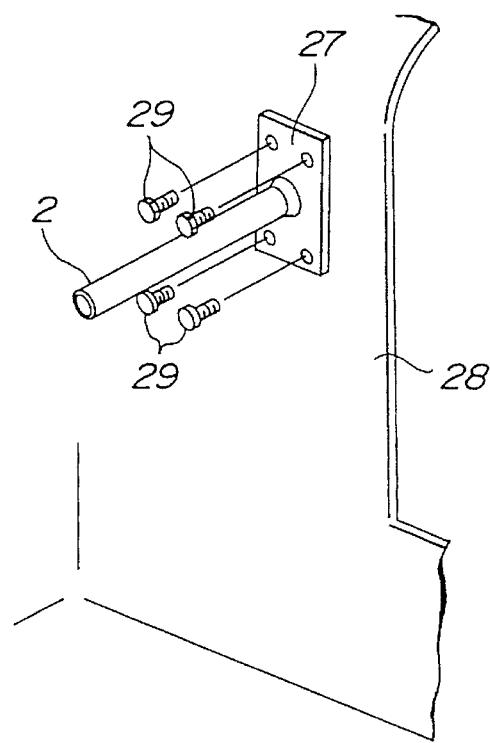
FIG. 4 is a perspective view which shows an installation of a steering support member.
Figure 5:
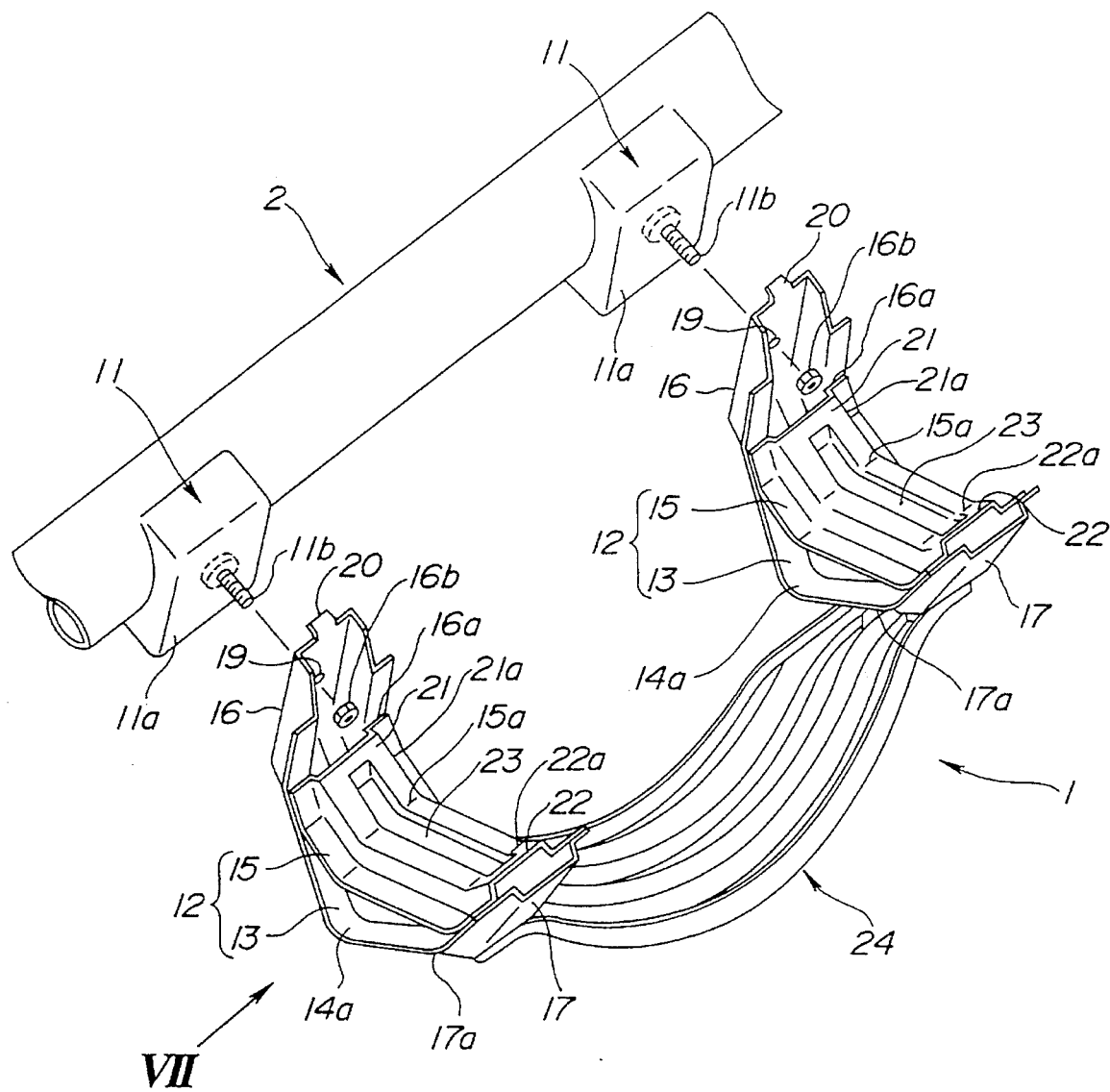
FIG. 5 is a perspective view of the knee protector device according to the present invention.

The knee protector device 1 is installed inside of an instrument panel 10 of the vehicle as shown in FIG. 1. The knee protector device 1 is disposed in front of a driver's seat as shown in FIG. 3. Furthermore, another knee protector device 1 is disposed in front of a front occupant's seat as shown in FIG. 2. A steering support member 2 of a tube shape is disposed in the instrument panel 1 to traverse the vehicle laterally. Both ends of the steering support member 2 are formed into end panels 27 as shown in FIG. 4, and are fixed to vehicle body panels 28 through bolts 29. As shown in FIG. 5, the steering support member 2 has a pair of bracket installation portions 11 fixed by means of welding. The bracket installation portion 11 has a flat installation surface 11a directing backward of the vehicle. A welded bolt 11b is protrudingly fixed at a center portion of the installation surface 11a.

Figure 6:
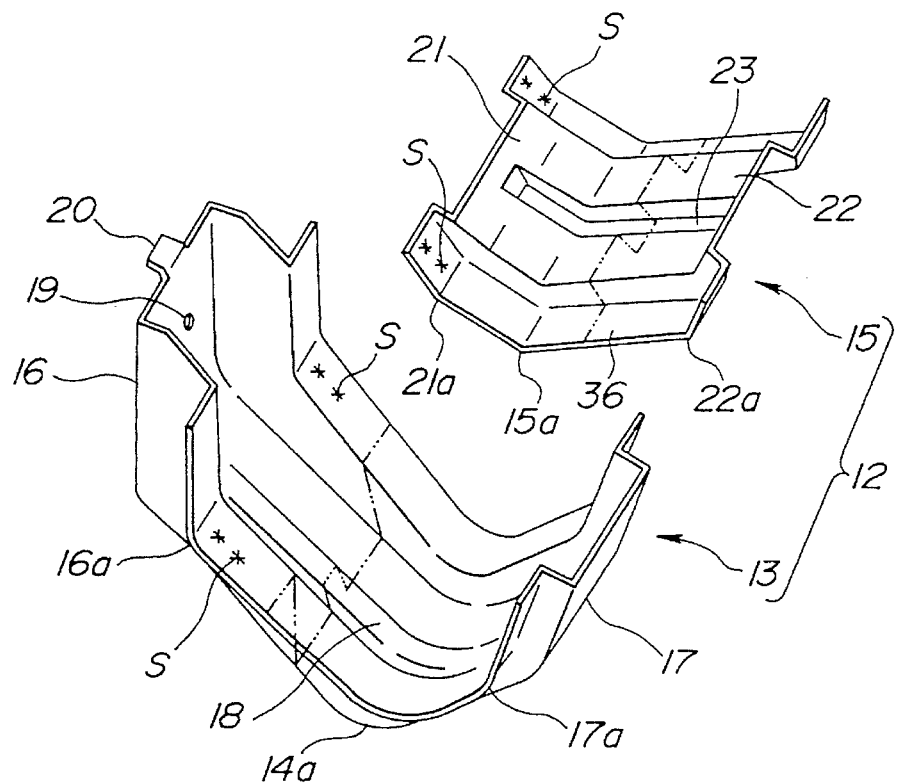
FIG. 6 is an exploded perspective view of a bracket of the knee protector device of FIG. 5.
Figure 7:
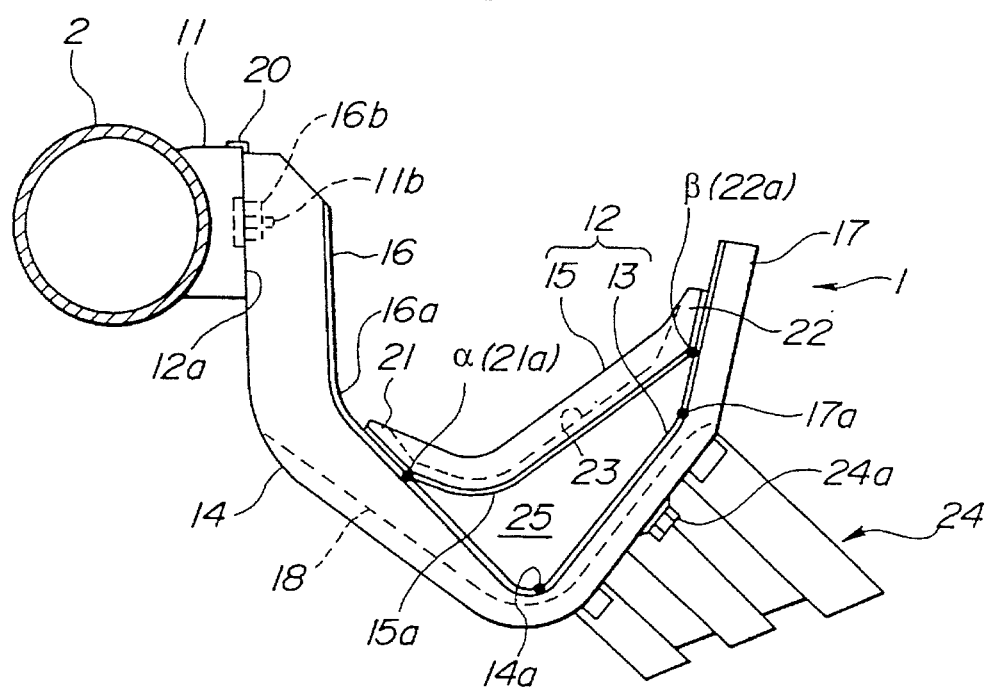
FIG. 7 is a side view of the knee protector device.

The knee protector device 1 comprises a bracket 12 constituted by a lower bracket 13 and an upper bracket 15. The lower bracket 13 is constituted by a front end portion 16, an intermediate portion 14 and a rear end portion 17 which are integrally connected. The intermediate portion 14 is formed in a V-shape and has a bend guide portion 14a at its generally middle position of an upper face as shown in FIG. 7. At the bend guide portion 14a the lower bracket 13 is arranged to be slowly bent so as to start bending at the bend guide portion 14a when predetermined force is applied to the knee protector device 1. Furthermore, the lower bracket 13 has a second bend guide portion 16a at a boundary of the front end portion 16 and the intermediate portion 14, and a third bend guide portion 17a at a boundary of the rear end portion 17 and the intermediate portion 14. The lower bracket 13 is slowly bent at the second and third bend guide portions 16a and 17a, respectively as shown in FIGS. 6 and 7. The lower bracket 13 is formed generally U-shaped in cross-section along the lateral direction of the vehicle. Further, the intermediate portion 14 of the lower bracket 13 has a bead portion 18 which projects upwardly and extends in the fore-and-aft direction. As shown in FIG. 7, the lower bracket 13 is formed so that the depth of the U-shaped portion at a front half side is larger than that of a rear half side and is gradually decreased toward the bend guide portion 14a. That is, the lower bracket 13 is formed such that the structural strength at the front half side is higher than that at the rear half side. Accordingly, the lower bracket 13 has a sufficient rigidity against vertical vibrations. Furthermore, the lower bracket 13 has an installation hole 19 for inserting the welded bolt 12b and a projection piece 20 for adjusting the installation position of the lower bracket 13 to the installation portion 11.

The upper bracket 15 is constituted by a front end portion 21 and a rear end portion 22 and an intermediate portion 36. The intermediate portion 36 is formed in a V-shape and integrally connected with the front and rear end portions 21 and 22, respectively. A bend guide portion 15a is formed at an upper middle portion of the intermediate portion 36. Bend guide portions 21a and 22a are formed at a boundary of the front end portion 21 and the intermediate portion 36 and a boundary of the intermediate portion 36 and the rear end portion 22, respectively. The bend guide portion 15a formed at a generally middle portion of the upper bracket 15 is offset toward a front side, and therefore the upper bracket 15 is formed asymmetric in the fore-and-aft direction. The upper bracket 15 is formed generally reversed U-shaped in cross-section along the lateral direction of the vehicle. Further, the intermediate portion 36 of the upper bracket 15 has a bead portion 23 which projects downward and extends in the fore-and-aft direction.

The front end portion 21 of the upper bracket 15 is fixed to the front end portion 16 of the lower bracket 13 by means of spot welding. Similarly, the rear end portion 22 of the upper bracket 15 is fixed to the rear end portion 17 of the lower bracket 16 at positions S shown in FIG. 6 by means of spot welding. These welding operations are executed by a spot-welding robot which executes spot-welding operations according to a preset program. The upper and lower bracket 15 and 13 define a polygon space 25 which has a deformed pentagonal shape.

A knee protector body 24 is fixed to the pair of brackets 12 through bolts 24a as shown in FIG. 2. The lower end portion of the knee protector body 24 is located backward of the bend guide portion 14a. The knee protector body 24 has a pair of connecting end portions 24b through which the knee protector body 24 is fixed with the pair of brackets 12 by means of bolts and nuts 24a. The knee protector body 24 has a plurality of beads (no numeral) to form a generally continuous waves in cross section in the vertical direction, and is curved backward to form an arc, as shown in FIG. 5.

The assembled knee protector device 1 is installed to the steering support member 2 by inserting the welded bolts 11b to the installation holes 19 of the lower bracket 13 and screwing nuts 16b to the bolts 12b, respectively. Since the front end portion 16 of the lower bracket 13 is fitted with the installation surface 11a of the installation portion 11 and the projection piece 20 is fitted with the upper surface of the installation portion 11 when the nuts 16b are fixedly screwed, the bracket 12 is kept in a fair fixing condition to the installation portion 11 of the steering support member 2.

Next, referring to FIGS. 2, 3, 8 and 9, the installation ability of the upper bracket 15 to the lower bracket 12 and modes of the deformation of the bracket 12 will be discussed hereinafter.

Figure 8:
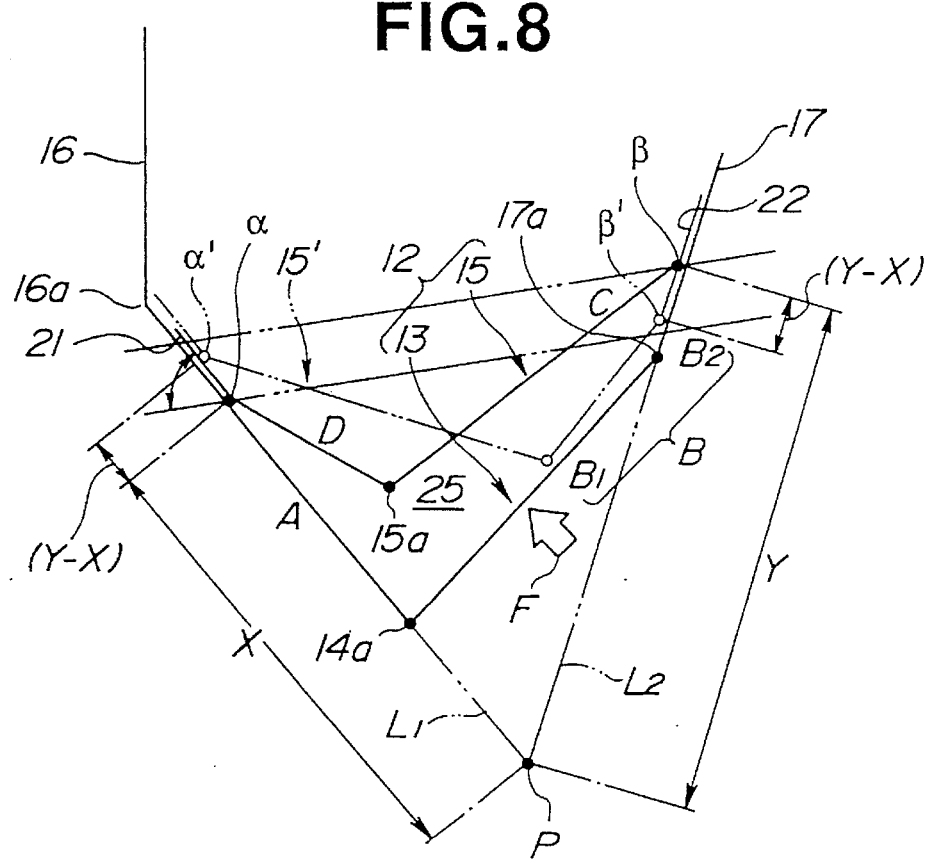
FIG. 8 is a view which shows a dimensional relationship of the upper and lower brackets of the knee protector device according to the present invention.

Since the upper bracket 15 is asymmetrical in the fore-and-aft direction, incorrect installation of the upper bracket 15 to the lower bracket 13 is easily avoided. In this embodiment, the polygon space 25 of the bracket 12 is formed by connecting an installation point α of the front end portion 21 of the upper bracket 15 and the lower bracket 13, a point indicative of the bend guide portion 14a, a point indicative of the third bend guide portion 17a, a rear installation point β of the rear end portion 15 of the upper bracket 15 and the rear end portion 17 of the lower bracket 14, and a point indicative of the bend guide portion 15a of the upper bracket 15, as shown in FIG. 8, wherein A is a side between the front installation point a and the guide portion 14a, B is a side between the bend guide portion 14a and the rear installation point β (the side B is constituted by $B_1$ and $B_2$), C is a side between the rear installation point β and the bend guide portion 15a, and D is a side between the bend guide portion 15a and the front installation point α. As shown in FIG. 8, a straight line $L_1$ along the side B including the front installation point α and a straight line $L_2$ along the side $B_2$ are crossed at a point P.

When the upper bracket 15 is correctly installed to the lower bracket 14, a length X from the cross point P to the front installation point α is different from a length Y from the cross point P to the rear installation point β (X<Y, that is, X≠Y). As shown by imaginary lines denoted by two-dot and dash lines in FIG. 8, if the upper bracket 15' is incorrectly installed to the lower bracket 13, the incorrect installation points α' and β' become different from the correct installation points α and β by (Y-X). Accordingly, it becomes easy to distinguish whether the upper bracket 15 is correctly installed to the lower bracket 14 or not. Furthermore, if the installation positions α' and β' are offset from the correct positions, the spot-welding robot can not execute welding operations to the incorrectly installed upper bracket 15. Accordingly, the erroneous installation of the upper bracket 15 is securely distinguished and avoided.

As shown in FIG. 2, when a knee portion H of a front-seat occupant is impacted with the knee protector body 24 in the event of a vehicular collision, the force from the knee portion H is transmitted to bracket 12. Accordingly, the upper and lower brackets 13 and 15 are bent at the bend guide portions 14a and 15a so that rear portions of the brackets 13 and 15 are moved forward. Next, the bent bracket 12 is further bent at the bend guide portion 16a in the front direction. Therefore, the brackets 12 sufficiently absorb the impact force and save the knees of the front seat occupant.

On the other hand, at the driver's seat side, a space above the knee protector device 1 is filled with various equipment such as instruments 25 and a steering 26, as shown in FIG. 3. Accordingly, it is necessary that the knee protector device is arranged so as not to be bent upward and not to interfere with the various equipment. As mentioned above, since the knee protector device 1 for a driver is arranged to be similar to that of the front seat occupant, the knee protector device 1 does not interfere with the various equipment and sufficiently absorbs the impact force by the deformation of the knee protector device 1.

Figure 9:
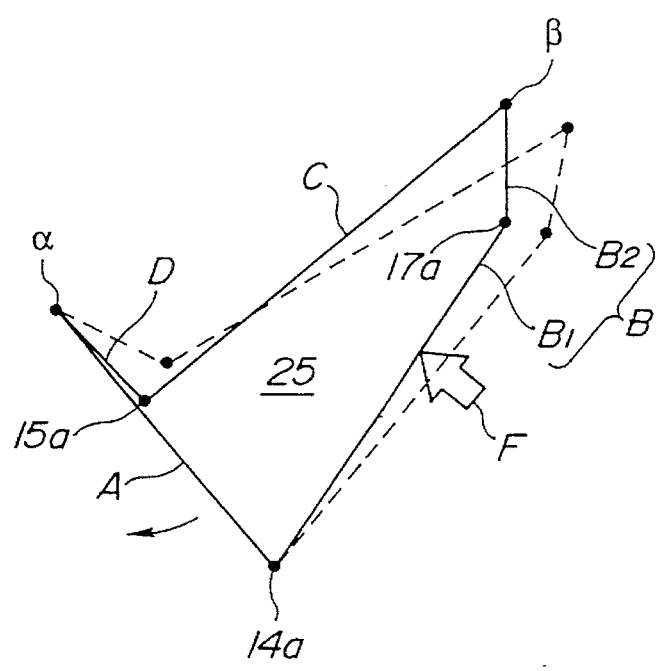
FIG. 9 is a view for explaining a deformation of a polygon space of the bracket when a bend guide portion is confronted with a side A.

That is, when the bracket 12 receives predetermined force, the sides B and C of the polygon space 25 are bent in the front direction on the bend guide portions 14a and 15a, as shown in FIG. 9. In this embodiment, the sides A to D are formed to satisfy the following dimensional relationship (A-D)>(B-C). Accordingly, when the bending of the sides B and C toward the front direction is proceeded, the bend guide portion 15a located at a lower end of the side C is confronted with the side A as shown in FIG. 9. Since the side A is push forward by the bend guide portion 15a, after the forward bending of the sides B and C, the bracket 12 is deformed so that the polygon space 25 is rotated forward on the installation point α of an upper end of the side A. Accordingly, a stroke of the deformation of the polygon space 25 is elongated, and therefore the polygon space 25 ensures a sufficient deformation mode.

Figure 10:
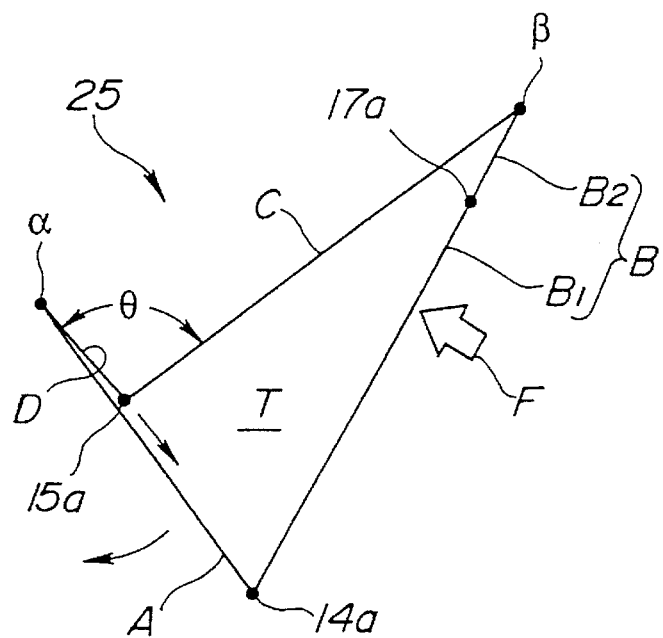
FIG. 10 is a view for explaining a deformation process of the bracket.

Although during the deformation of the polygon space 25, a triangle T constituted by the side B, the side C and the side (A-D) is formed as shown in FIG. 10, if the following relationship $B^2 > (A-D)^2 + C^2$ is satisfied, the angle θ at the portion 15a becomes an acute angle. Therefore, the bracket 12 is deformed such that the bend guide portion 15a proceeds along the side A toward the bend guide portion 14a. This deformation mode is preferably executed.

Figure 11:
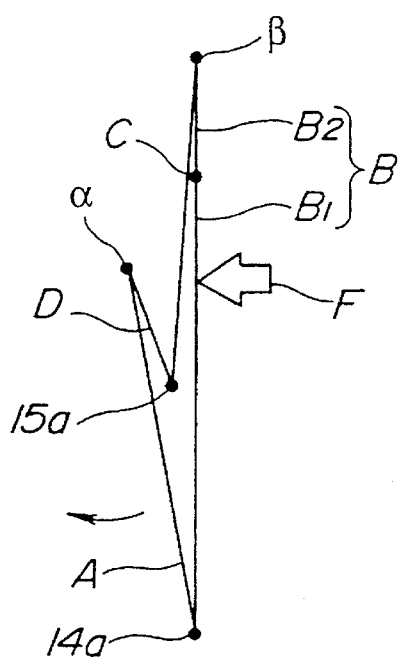
FIG. 11 is a view for explaining a deformation process of a polygon space of the bracket of a modification of the first embodiment.

FIG. 11 is a modification of the first embodiment of the knee protector device 1 according to the present invention, wherein the sides A to D for defining the polygon space 25 has a relationship that (A-D)=(B-C). Accordingly, since the bend guide portion 15a of the upper bracket 15 is in contact with the side A, the side B perfectly overlaps the side A so as to completely crash the polygon space 25. This ensures a sufficient deformation mode.

Figure 12:
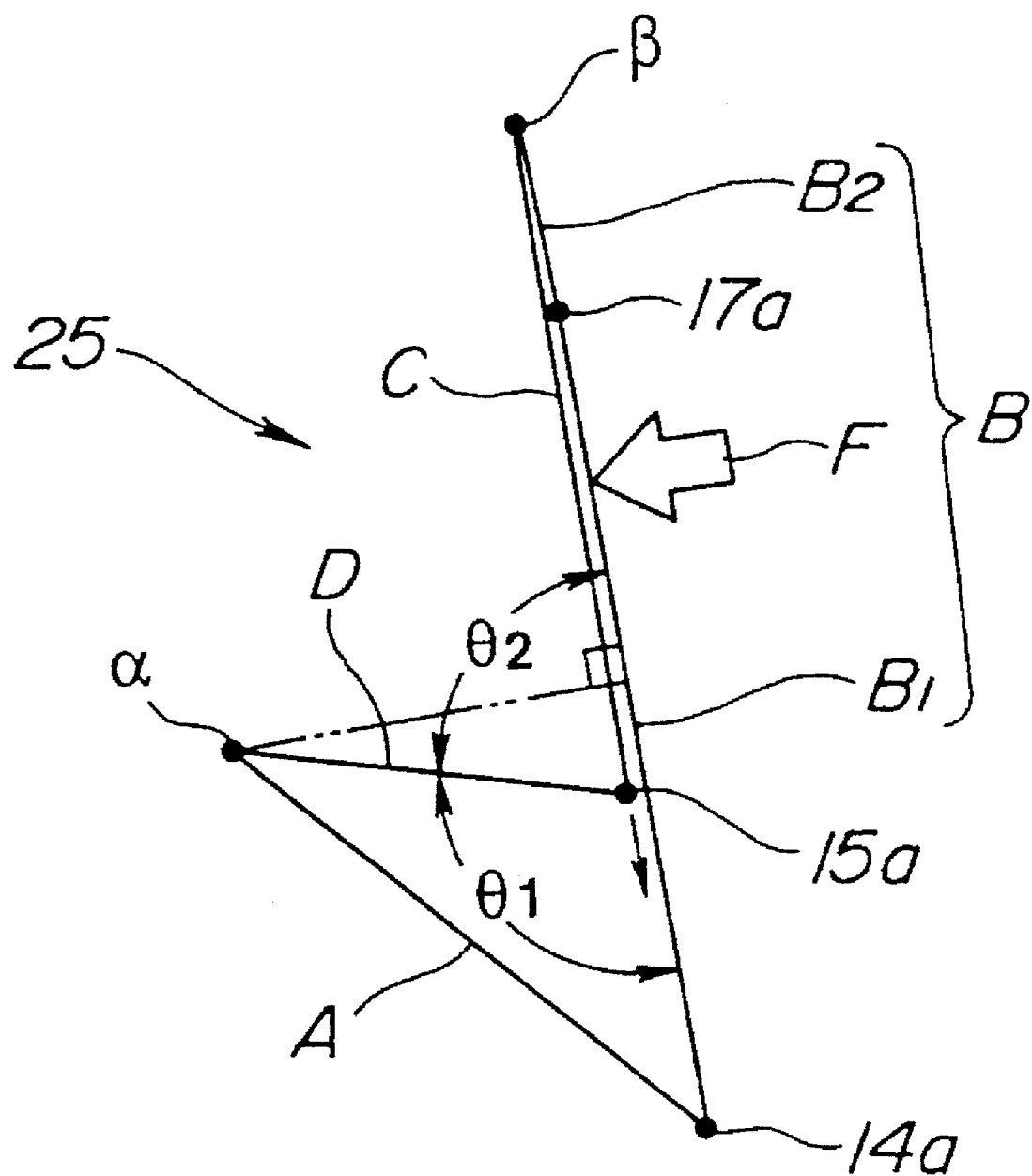
FIG. 12 is a view for explaining a deformation process of a polygon space of the bracket of another modification of the first embodiment.
Figure 13:
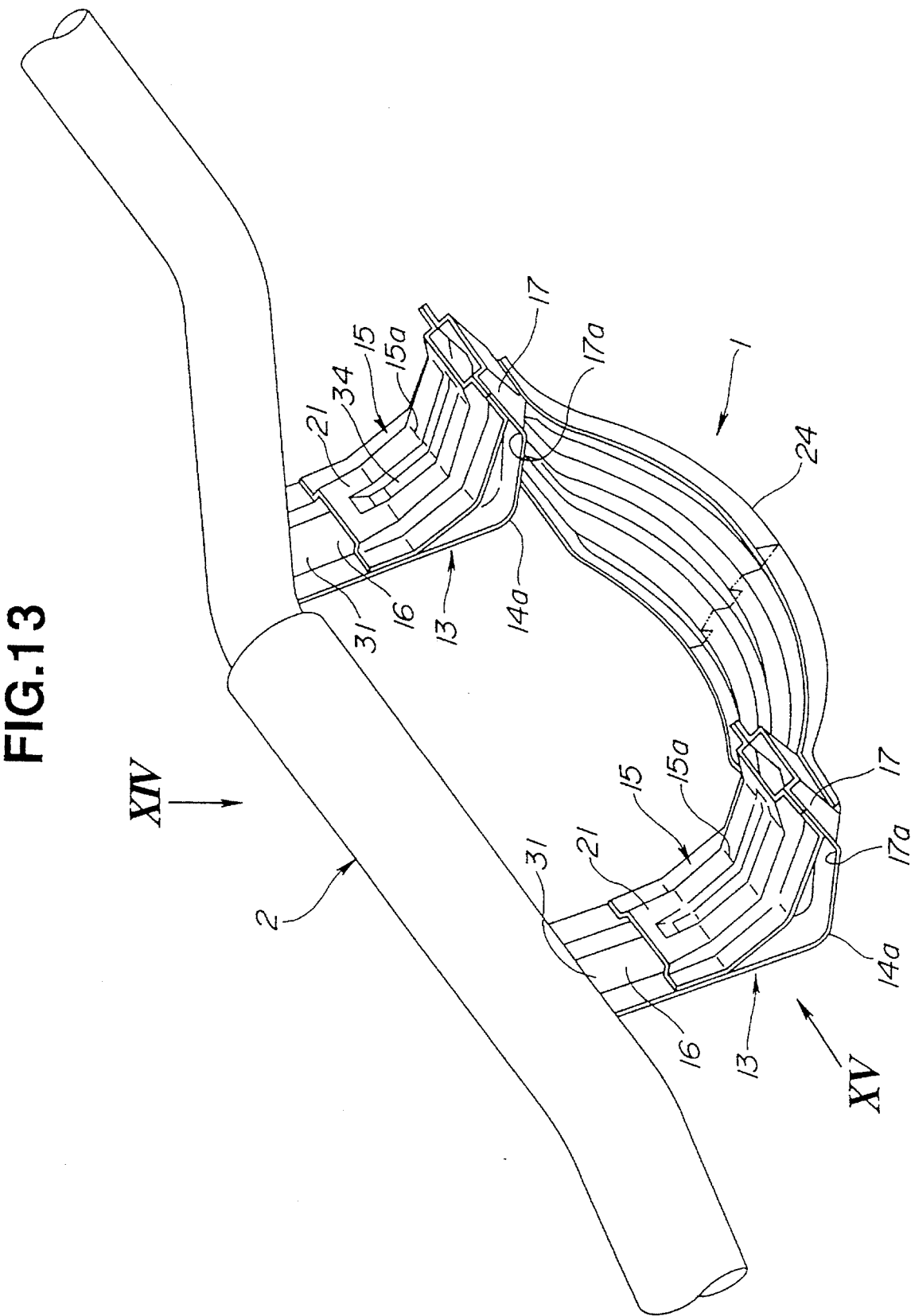
FIG. 13 is a perspective view of a second embodiment of the knee protector device according to the present invention.
Figure 14:
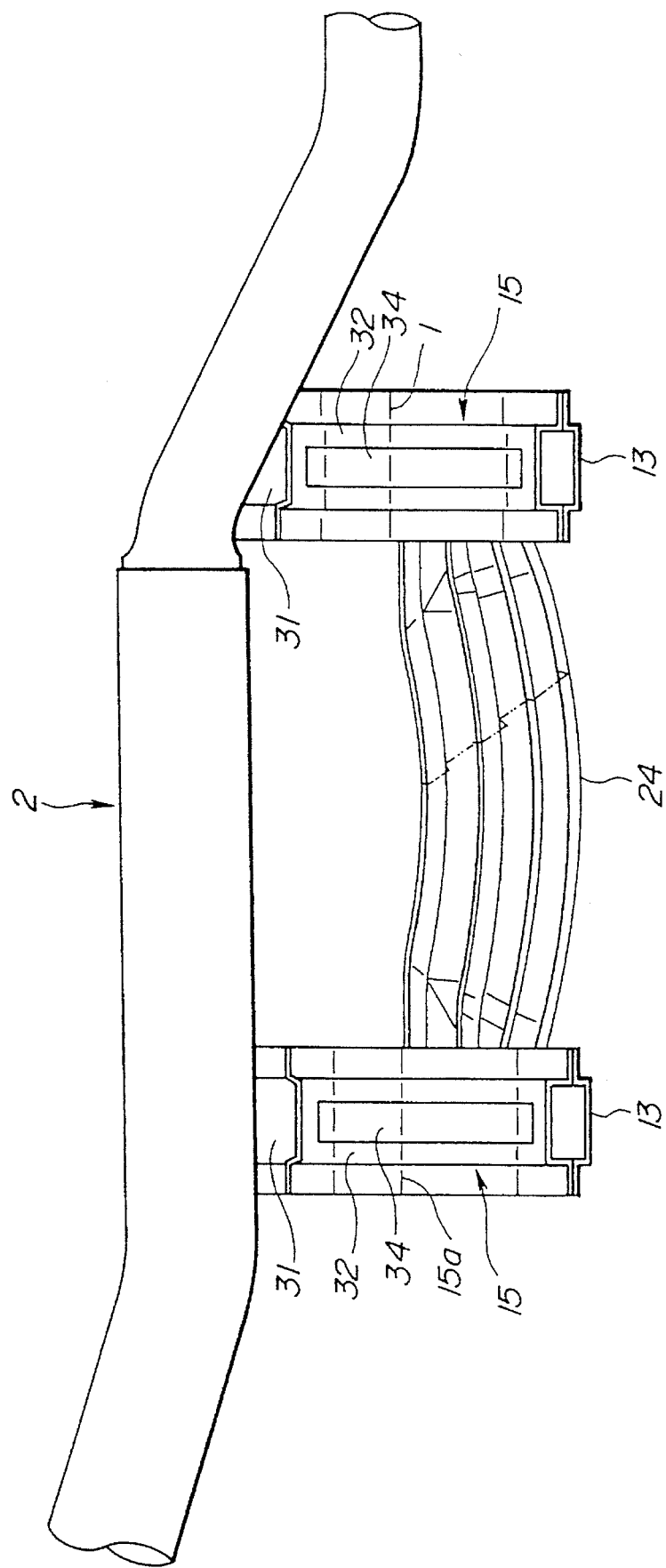
FIG. 14 is a top view of the knee protector device of FIG. 13.

FIG. 12 shows another modification of the first embodiment of the knee protector device 1, wherein the sides A to D for defining the polygon space 25 have a relationship that $A^2 > (B-C)^2 + D^2$. Accordingly, when the bracket 12 receives predetermined force, the sides B and C of the polygon space 25 are bent in the front direction on the bend guide portions 14a and 15a. Since the sides A to D are formed to satisfy the following dimensional relationship $A^2 > (B-C)^2 + D^2$, when the bending of the sides B and C toward the front direction are proceeded, the bend guide portion 15a located at a lower end of the side C is confronted with the side B as shown in FIG. 12. Since the side B is push backward by the bend guide portion 15a, after the backward bending of the side B the bracket 12 is deformed so that the polygon space 25 is rotated forward on the installation point α of an upper end of the side A. Accordingly, a stroke of the deformation of the polygon space 25 is elongated, and therefore the polygon space 25 ensures a sufficient deformation mode.

During the deformation of the polygon space 25, a triangle T constituted by the side B, the side C and the side (A-D) is formed as shown in FIG. 10. If the following relationship $A^2 > (B-C)^2 + D^2$ is satisfied, the angle θ at the portion 15a becomes an acute angle. Therefore, the bracket 13 is deformed such that the bend guide portion 15a proceeds along the side A toward the bend guide portion 14a so as to sufficiently absorb the impact force for protecting knees of vehicle passengers.

With the thus arranged knee protector of the first embodiment, the upper bracket 15 is correctly connected to the lower bracket 13, and the bracket 12 performs an adequate deformation mode so as to sufficiently and securely absorb applied force. Furthermore, since the bracket 12 is formed so as not to project upwardly during deformation and usual condition, it is possible to ensure a relatively large space above the bracket 12 for an air duct in the instrument panel 10 while improving an installation operation of the bracket 12 to the steering support member 2.

FIGS. 13 to 17 show a second embodiment of the knee protector according to the present invention.

Figure 15:
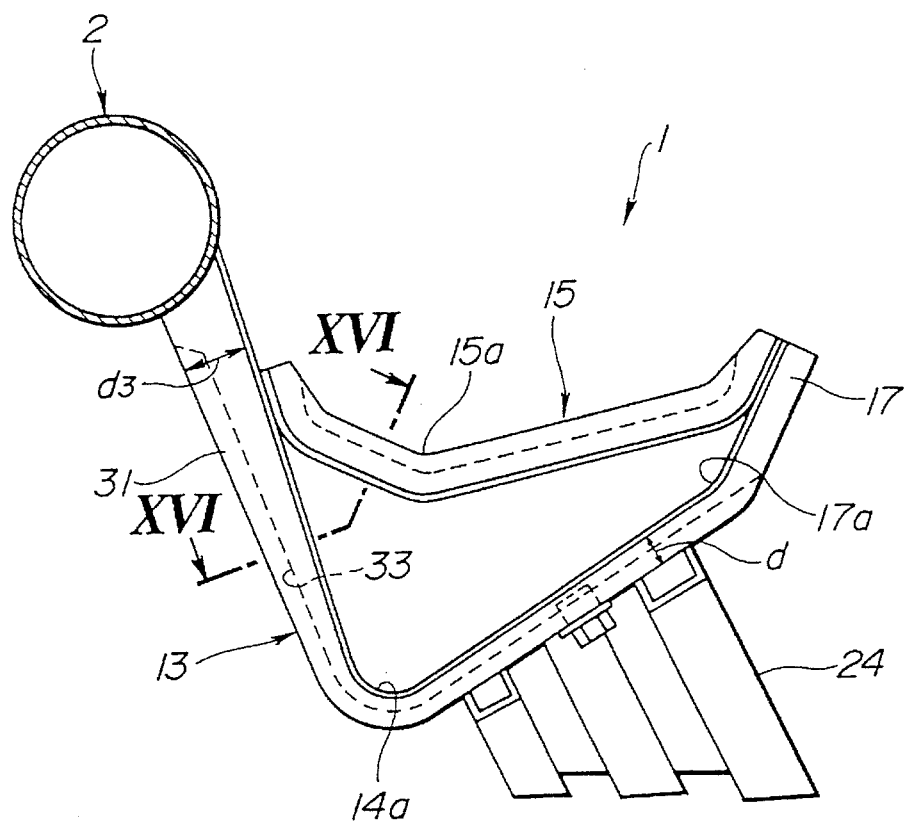
FIG. 15 is a side view of the knee protector device of FIG. 13.
Figure 17:
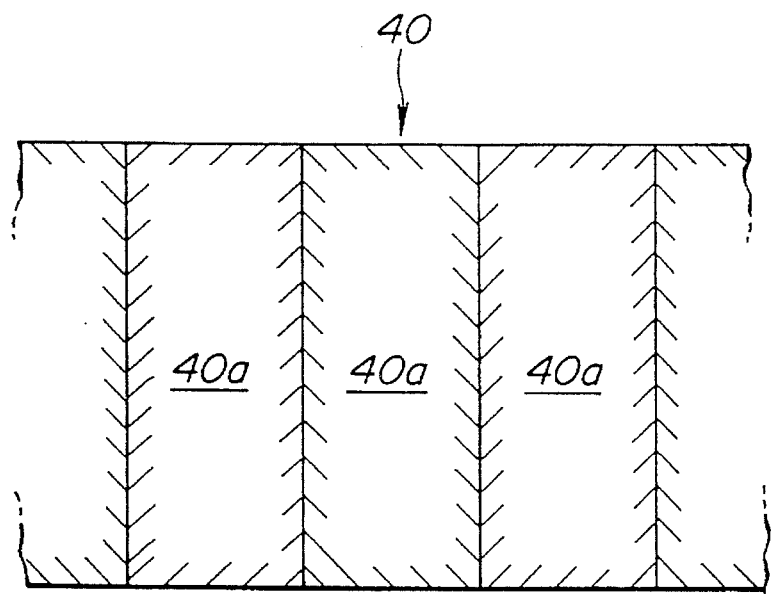
FIG. 17 is a schematic plan view of a material plate for the lower brackets.

The knee protector device 1 comprises a pair of brackets 12 installed to the steering support member 2 and a knee protector body 24 installed to the brackets 12. As similar to the first embodiment, each bracket 12 of the second embodiment has a lower bracket 13 and an upper bracket 15. The lower bracket 13 has a V-shaped intermediate portion 14, a front end portion 16 and a rear end portion 17. The intermediate portion 14 is formed in a V-shape and has a bend guide portion 14a at which the lower bracket 13 starts to bend when predetermined force is applied thereto. The rear end portions 17 are respectively connected to a rear side end of the intermediate portion 14. A rear bend guide portion 17a is formed at a boundary between the intermediate portion 14 and the rear end portion 17. The lower bracket 13 is in a generally U-shape in cross-section in the lateral direction to form a protruding portion 31. A bead portion 33 is formed at the protruding portion 31 in the fore-and-aft direction. The protruding portion 31 of the lower bracket 13 is formed so that the depth of the protruding portion 31 is gradually decreased from the front end to the bend guide portion 14a and so that the depth of the protruding portion 31 is constant from the bend guide portion 14a to a rear end of the lower bracket 13, as shown in FIG. 15. The front end portion 16 is integral with the intermediate portion 14 and is welded to a steering support member 2. The bracket 11 is made from a cut rectangular plate 40a of a materiel sheet 40 as shown in FIG. 17 and is shaped by a press-working.

Figure 16:
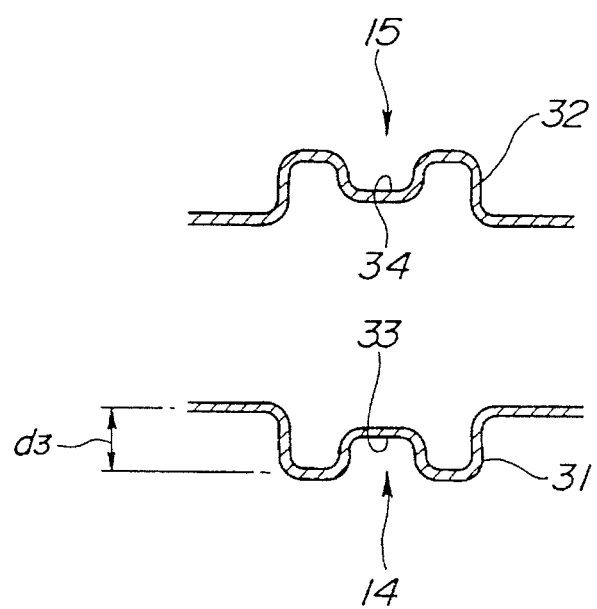
FIG. 16 is a sectional view of the knee protector device of FIG. 15 taken in the direction of arrows along the XVI—XVI lines.

An upper bracket 15 is connected with the lower bracket 13 so as to from a polygon space therebetween as shown in FIG. 15. The upper bracket 15 is formed in a generally V-shaped and has a bend guide portion 15a at an upper middle portion of the V-shape. The upper bracket 15 has a protruding portion 32 which is formed in a reversed U-shaped in cross section. The upper bracket 15 further has a bead portion 34 at the protruding portion 32. Accordingly, as shown in FIG. 16, the cross section of the upper bracket 15 is generally formed symmetric with that of the lower bracket 13.

With the thus arranged knee protector device of the second embodiment, since the lower bracket 13 is made from a rectangular plate by press-working, loss of the material for the bracket 12 is effectively decreased. Furthermore, the lower bracket 13 is formed so that a front half side of the lower bracket 13 is formed larger in rigidity than a rear half side of the lower bracket 13, the lower bracket ensures a high rigidity against vertical vibrations while ensuring a sufficient deformation mode of the bracket 12.

Figure 18:
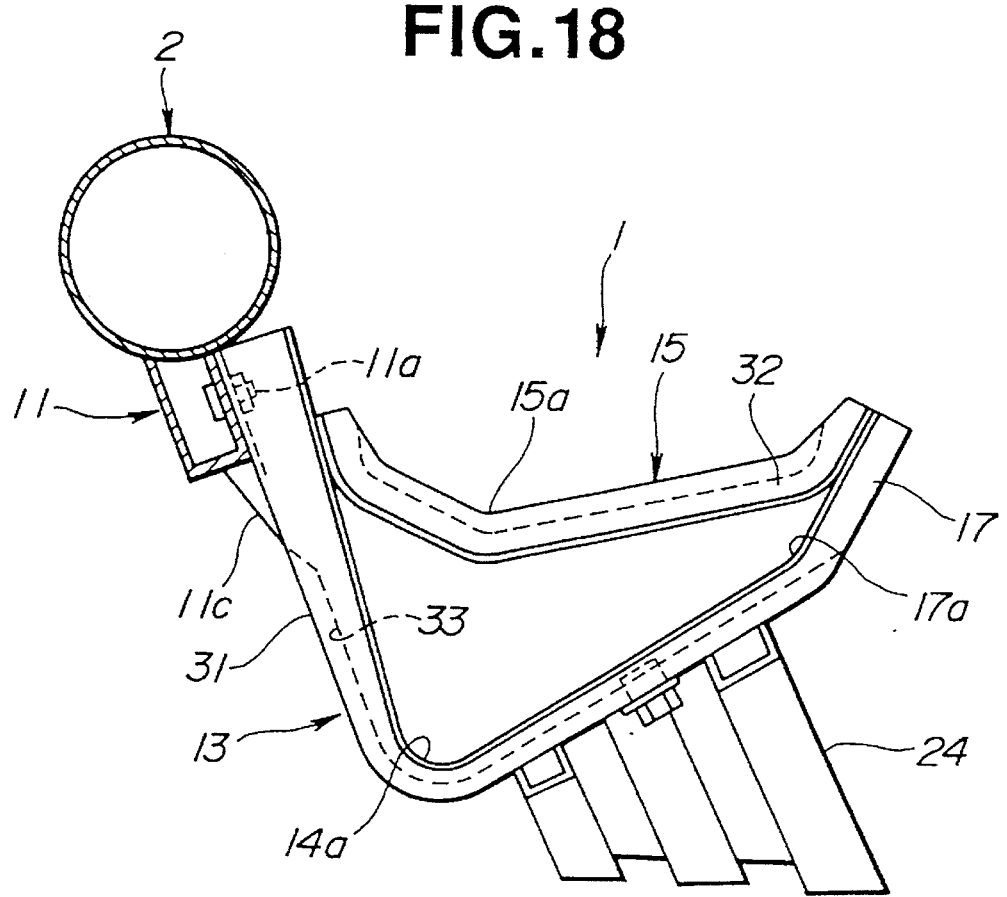
FIG. 18 is a side view of a third embodiment of the knee protector device according to the present invention.

FIG. 18 shows a third embodiment of the knee protector device according to the present invention.

The structure of third embodiment is generally similar to that of the second embodiment except that each lower bracket 13 is connected with the steering support member 2 by means of a bolt 11a and a nut 11b. The steering support member 2 has a pair of bracket installation portions 11. The bolt 11a is welded to each bracket installation portion 11. The lower bracket 13 has an installation hole 19 through which the welded bolt 11a is screwed to the nut 11b to fix the bracket 12 with steering support member 2. A triangular stopper 23 for adjusting a position of the lower bracket 13 to the steering support member 2 is integrally formed at the front side of the lower bracket 13.

With the thus arranged knee protector device of the third embodiment, it becomes easy to install the knee protector device 1 to the steering support member 2 while ensuring a sufficient deformation mode and a proper rigidity.

Figure 19:
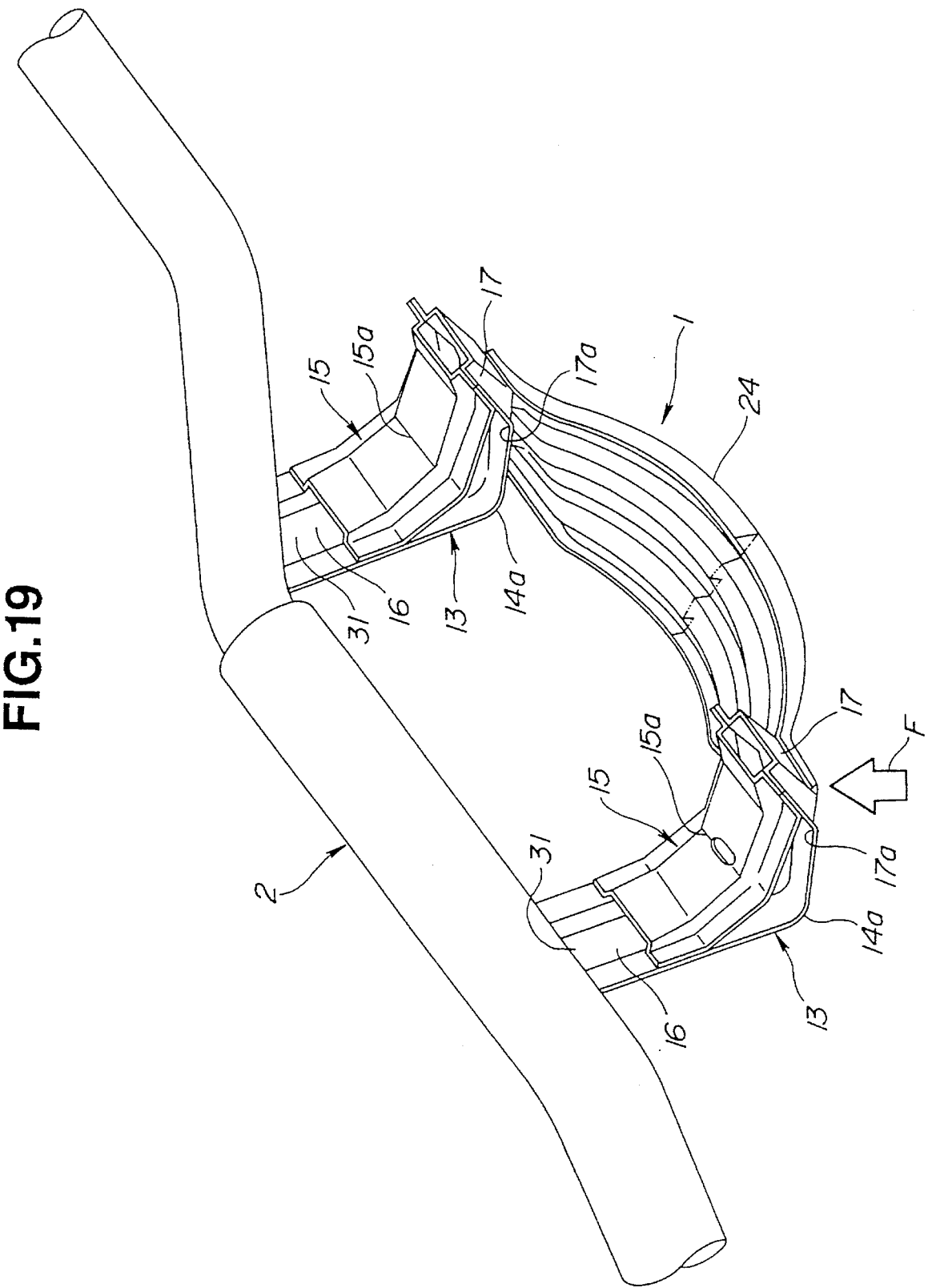
FIG. 19 is a perspective view of a fourth embodiment of the knee protector device according to the present invention.

FIG. 19 shows a fourth embodiment of the knee protector device according to the present invention.

The structure of the fourth embodiment is generally similar to that of the second embodiment except that each upper bracket 15 does not have a bead portion 34, and that a cut-out portion 25 of an elliptic shape is formed at the bend guide portion of the left hand side upper bracket 15 so as to control the rigidity of the lower bracket 13. That is, by controlling a shape and a size of the cut-out portion 25, it becomes possible to adjust the rigidity of the lower bracket 13 so as to bend with a best mode.

In case that the cut-out portion 25 is formed at the bend guide portion 15a of the upper bracket 15, even if predetermined force F is applied from an oblique direction to the lower bracket 13, the lower bracket 13 can absorb the force F since the lower bracket 13 is formed easy to twistingly deform by the virtue of the cut-out portion 25.

Although in the fourth embodiment the cut-out portion 25 has been formed only at the left hand side lower bracket 13, it will be understood that the cut-out portion 25 may be formed at the right hand side lower bracket 13.

While the lower bracket 13 has been formed so that the depth thereof is gradually decreased from the front end to the bend guide portion, the groove of the front side of the lower bracket 13 may be formed to be equally constant in depth from the front end to the bend guide portion but to be larger in depth than that of the rear portion from the bend guide portion to the rear end.

Furthermore, although in the preferred embodiments of the present invention the knee protector body 24 has been shown and described to be connected with the brackets 13, it will be understood that the knee protector body 24 may be connected with a lower portion of a vehicle body in addition to the connection with the lower brackets 13.

Although only the third embodiment has been shown and described so that the lower bracket 13 is made from a rectugular shape plate by means press-working, it will be understood that such production procedure may be applied to the lower brackets of other embodiments.

While the invention has been particularly shown and described with reference to preferred embodiments thereof, it will be understood by those skill in the art that the forgoing and other changes in form and details can be made without departing from the sprits and scope of the invention.

What is claimed is:

1. A knee protector device comprising:

a knee protector body; and a pair of brackets connected to said knee protector body, said bracket being constituted by a lower bracket and an upper bracket, the lower bracket being formed in a generally V-shape and having a bend guide portion at a middle portion of the V-shaped lower bracket, the upper bracket being formed in a generally V-shape and having a bend guide portion at a middle portion of the V-shaped upper bracket, the upper bracket being connected with the lower bracket so that both V-shapes of the upper and lower brackets are arranged in the same direction.

2. A knee protector device as claimed in claim 1, wherein a front end portion of the lower bracket is formed so as to be attachable and detachable to a steering support member fixed to a vehicle body.

3. A knee protector device as claimed in claim 2, wherein the steering support member has a pair of installation portions each of which has a welded bolt, the lower bracket having an installation hole through which the welded bolt is screwed with a nut so that the lower bracket is fixed to the steering support member.

4. A knee protector device as claimed in claim 1, wherein each end portion of the knee protector body is connected at a rear portion located backward of the bend guide portion in the lower bracket.

5. A knee protector device as claimed in claim 1, wherein said bracket includes a polygon space formed by the upper and lower brackets, said bracket being formed so as to satisfy the following relationships:

$$X \neq Y, \text{ and } (A-D) \geq (B-C)$$

wherein a point P is defined as an intersection between a line X is a first line and a second line where the first line is along a first side of the lower bracket which side includes a front installation point F between front end portions of the upper and lower brackets and the second line is along a second side of the lower bracket which side includes a rear installation point R of rear end portion of the upper and lower brackets, X is a distance between the point P and the front installation point F, Y is a distance between the point P and the rear installation point R, A is a distance between the front installation point F and a point LG indicative of a bend guide portion of the lower bracket, B is a distance between the rear installation point R and the point LG, C is a distance between the rear installation point R and a point UG indicative of the bend guide portion of the upper bracket, and D is a distance between the front installation point F and the point UG.

6. A knee protector device as claimed in claim 5, wherein a relationship $(A-D)=(B-C)$ is satisfied.

7. A knee protector device as claimed in claim 5, wherein another bend guide portion is formed at a portion of the lower bracket between the bend guide portion and the rear installation point R.

8. A knee protector device as claimed in claim 5, wherein the lower bracket is formed so that a rigidity of a front portion of the lower bracket is higher than that of a rear portion of the lower bracket.

9. A knee protector device as claimed in claim 5, wherein each end portion of the knee protector body is connected at a rear portion located backward of the bend guide portion in the lower bracket.

10. A knee protector device as claimed in claim 1, wherein said bracket includes a polygon space formed by the upper and lower brackets, said bracket being formed so as to satisfy the following relationships:

$$X \neq Y, \text{ and } A^2 \geq (B-C)^2 + D^2$$

wherein a point P is defined as an intersection between a line X is a first line and a second line where the first line is along a first side of the lower bracket which side includes a front installation point F between front end portions of the upper and lower brackets, and the second line is along a second side of the lower bracket which side includes a rear installation point R of rear end portion of the upper and lower brackets, X is a distance between the point P and the front installation point F, Y is a distance between the point P and the rear installation point R, A is a distance between the front installation point F and a point LG indicative of a bend guide portion of the lower bracket, B is a distance between the rear installation point R and the point LG, C is a distance between the rear installation point R and a point UG indicative of the bend guide portion of the upper bracket, and D is a distance between the front installation point F and the point UG.

11. A knee protector device as claimed in claim 10, wherein another bend guide portion is formed a portion of the lower bracket between the bend guide portion and the rear installation point R.

12. A knee protector device as claimed in claim 10, wherein the lower bracket is formed so that a rigidity of a front portion of the lower bracket is higher than that of a rear portion of the lower bracket.

13. A knee protector device as claimed in claim 10, wherein each end portion of the knee protector body is connected at a rear portion located backward of the bend guide portion in the lower bracket.

14. A vehicular knee protector device, comprising:
 a V-shaped bracket including a front portion and a rear portion which is integral with the front portion at a middle portion of the V-shape where a bend guide portion is formed so as to start to bend from the bend guide portion when predetermined force is applied, said bracket being formed to define a groove which extends from the front portion to the rear portion; and a knee protector body connected to the rear portion of the bracket;

wherein the groove is formed so that the depth of the groove at the front portion is deeper than that at the rear portion.

15. A vehicular knee protector device as claimed in claim 14, wherein the front portion of said bracket is formed so that the depth of the groove is gradually decreased from a front end side toward the rear portion.

16. A vehicular knee protector device as claimed in claim 14, wherein said bracket is formed from a rectangular plate by means of press-working.

17. A vehicular knee protector device as claimed in claim 14, wherein said protector body is connected to a vehicle through a pair of said brackets.

18. A vehicular knee protector device as claimed in claim 14, further comprising an upper bracket which is formed a generally V-shape and has a bend guide portion at a middle portion of the V-shape, said upper bracket being connected to said bracket so that both V-shapes of said bracket and said upper bracket are arranged in the same direction.

19. A vehicular knee protector device as claimed in claim 18, wherein said upper bracket has a cut-out at the bend guide portion.

* * * * *